(12) United States Patent
Cheong et al.

(10) Patent No.: US 11,838,184 B2
(45) Date of Patent: Dec. 5, 2023

(54) MANAGING NEIGHBOR AWARENESS NETWORKING TECHNOLOGIES FOR INTELLIGENT CONNECTIVITY

(71) Applicant: Dell Products, L.P., Round Rock, TX (US)

(72) Inventors: Minho Cheong, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 17/164,860

(22) Filed: Feb. 2, 2021

(65) Prior Publication Data

US 2022/0247642 A1 Aug. 4, 2022

(51) Int. Cl.
| | | |
|---|---|---|
| *H04L 41/12* | (2022.01) | |
| *H04L 67/1042* | (2022.01) | |
| *H04W 76/10* | (2018.01) | |

(52) U.S. Cl.
CPC .......... *H04L 41/12* (2013.01); *H04L 67/1042* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 2009/0024770 A1* | 1/2009 | Dubs | ...... | H04L 67/51 |
| | | | | 710/18 |
| 2011/0317586 A1* | 12/2011 | Palanki | ...... | H04W 8/005 |
| | | | | 370/254 |
| 2012/0011247 A1* | 1/2012 | Mallik | ...... | H04L 67/104 |
| | | | | 709/224 |
| 2013/0148557 A1* | 6/2013 | Sampath | ...... | H04W 52/0225 |
| | | | | 370/311 |
| 2014/0031028 A1* | 1/2014 | Yamada | ...... | H04W 76/14 |
| | | | | 455/419 |
| 2015/0382174 A1* | 12/2015 | Guo | ...... | H04W 72/048 |
| | | | | 370/311 |
| 2017/0238161 A1* | 8/2017 | Chakraborty | ...... | H04B 17/318 |
| | | | | 455/500 |
| 2018/0035275 A1* | 2/2018 | Gupta | ...... | H04W 52/0225 |

(Continued)

FOREIGN PATENT DOCUMENTS

WO   WO-2018090504 A1 *  5/2018  ............. G06F 9/445

OTHER PUBLICATIONS

Dyo, C. Mascolo, Efficient Node Discovery in Mobile Wireless Sensor Networks, pp. 478-485 (Year: 2008).*

(Continued)

*Primary Examiner* — Christopher M Crutchfield
(74) *Attorney, Agent, or Firm* — Fogarty LLP

(57) ABSTRACT

Systems and systems and methods for managing neighbor awareness networking (NAN) technologies for intelligent connectivity are described. In an embodiment, an Information Handling System (IHS) may include a processor and a memory coupled to the processor, the memory having program instructions stored thereon that, upon execution by the processor, cause the IHS to: determine that an intelligent connectivity rule is satisfied by context information collected by the IHS, and, in response to the determination, change the discovery state of a NAN-Aware engine.

19 Claims, 5 Drawing Sheets

(56) References Cited

U.S. PATENT DOCUMENTS

2018/0035363 A1* 2/2018 Gupta .................. H04W 48/16
2019/0065126 A1* 2/2019 Tachiwa ................ G06F 3/1231
2019/0174400 A1* 6/2019 Park ..................... H04W 48/16
2019/0369937 A1* 12/2019 Cavenaugh ........... G06F 1/1647
2021/0127244 A1* 4/2021 Choi .................. H04W 40/246

OTHER PUBLICATIONS

Author Unknown, Neighbor Awareness Networking Specification 3.0, pp. 1-204 (Year: 2018).*
C. Drula, Fast and Energy Efficient Neighbor Discovery for Opportunistic Networking with Bluetooth, pp. 1-60 (Year: 2005).*
Abhishek Thakur, R. Sathiyanarayanan, Chittaranjan Hota, STEEP: speed and time-based energy efficient neighbor discovery in opportunistic networks, pp. 1-22 (Year: 2018).*

* cited by examiner

MANAGING NEIGHBOR AWARENESS NETWORKING TECHNOLOGIES FOR INTELLIGENT CONNECTIVITY

FIELD

The present disclosure relates generally to Information Handling Systems (IHSs), and more particularly, to systems and methods for managing neighbor awareness networking technologies for intelligent connectivity.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for managing neighbor awareness networking technologies for intelligent connectivity are described. In an illustrative, non-limiting embodiment, an Information Handling System (IHS) may include a processor and a memory coupled to the processor, the memory having program instructions stored thereon that, upon execution by the processor, cause the IHS to: determine that an intelligent connectivity rule is satisfied by context information collected by the IHS, and, in response to the determination, change the discovery state of a neighbor awareness networking (NAN)-Aware engine.

In some cases, the context information may include at least one of: an identity of the user, a time-of-day, a calendar event, or a type of calendar event. Additionally, or alternatively, the context information may include at least one of: an application currently under execution, a duration of execution of an application, or a mode of execution of an application. Additionally, or alternatively, the context information may include at least one of: a user's proximity to the IHS, a location of the IHS, or a network connection. Additionally, or alternatively, the context information may include at least one of: a power usage, or a battery charge. Additionally, or alternatively, the context information may include a proximity of the IHS to a peripheral device. Additionally, or alternatively, the context information may include at least one of: an IHS posture, a hinge angle, or a lid state.

The context information may be collected, at least in part, via one or more hardware sensors coupled to the IHS. The program instructions, upon execution, may further cause the IHS to receive the intelligent connectivity rule from a backend service over a network.

The discovery state may be selected from the group consisting of: On and Off. The program instructions, upon execution, may further cause the IHS to establish or terminate a decentralized peer-to-peer (P2P) connection with at least one of: another IHS or a peripheral device after having changed the discovery state. For example, the decentralized P2P may include a Wi-Fi-Aware connection. The decentralized P2P may be established concurrently with a centralized P2P connection. For instance, the centralized P2P may include at least one of: a Wi-Fi connection or a Wi-Fi Direct connection.

In another illustrative, non-limiting embodiment, a memory storage device having program instructions stored thereon that, upon execution by one or more processors of an IHS, cause the IHS to: receive an intelligent connectivity rule from a backend service over a network; determine that the intelligent connectivity rule is satisfied by context information collected by the IHS; in response to the determination, change the discovery state of a neighbor awareness networking (NAN)-Aware engine to an On state; and establish a decentralized peer-to-peer (P2P) connection with at least one of: another IHS or a peripheral device via the NAN-Aware engine.

In another illustrative, non-limiting embodiment, a method may include: receiving, at an IHS, an intelligent connectivity rule from a backend service over a network; determining that the intelligent connectivity rule is satisfied by context information collected by the IHS; in response to the determination, changing the discovery state of a neighbor awareness networking (NAN)-Aware engine to an Off state; and terminating a decentralized peer-to-peer (P2P) connection with at least one of: another IHS or a peripheral device via the NAN-Aware engine.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
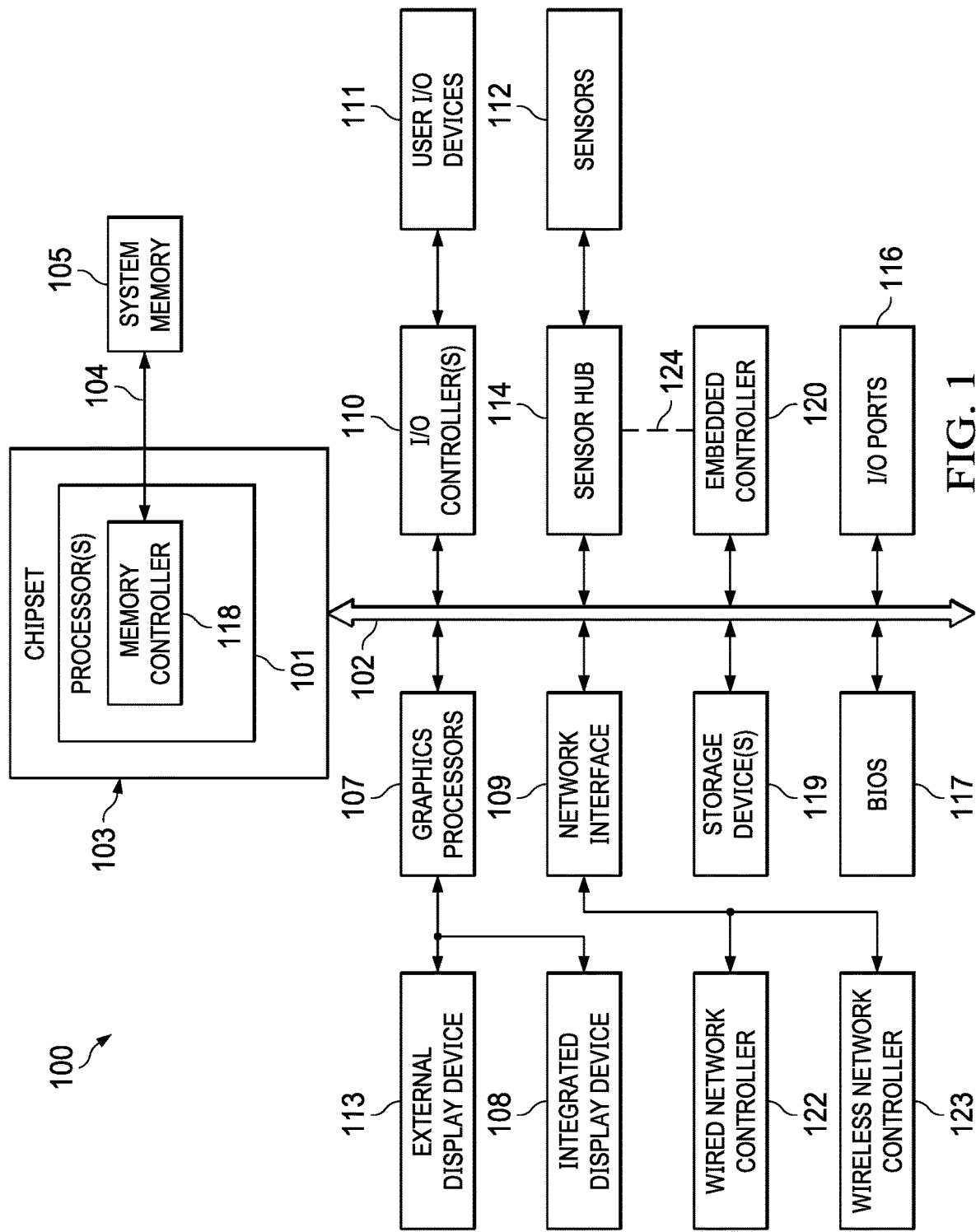
FIG. 1 is a block diagram of an example of an Information Handling System (IHS) configured to manage neighbor awareness networking (NAN) technologies for intelligent connectivity, according to some embodiments.

Systems and methods are described for managing neighbor awareness networking (NAN) technologies for intelligent connectivity. In some embodiments, NAN technologies may be used to bring contextually defined, peer-to-peer (P2 connectivity to Information Handling Systems (IHS) such as mobile devices without the need for, or independently of, any connection to infrastructure or a cellular network. An IHS configured with NAN awareness, as described herein, may leverage Wi-Fi (802.11), Bluetooth, Bluetooth Low Energy (BLE), or the like to discover and connect directly to people, information, or services based on physical context and tailored to individual preferences.

As a part of their discovery processes, NAN-Aware IHSs may estimate the distance between IHSs and use that estimation to determine whether discovery triggers any further actions, such as notification to the user or the setup of a specific type of data connection (e.g., P2P, mesh networking, etc.). In certain implementations, systems and methods described herein may enable power efficient, continuous background discovery of other IHSs and services, accurate peer-to-peer ranging, and instant, IP-based peer-to-peer data exchange.

Unlike conventional technologies such as infrastructure access point (AP) connection or Wi-Fi Direct (centralized P2P), NAN-Awareness does not require disconnecting an ongoing connection when there is a need to connect to a new IHS, because it provides a decentralized form of P2P or mesh networking such that the connection(s) can be service/discovery-based, dynamically established and tore down, and/or clustered. NAN-Aware technologies are expected to become more and more popular over time due to the additional merits compared to other wireless technologies. NAN-Awareness may enable foundational decentralized P2P firmware and software capabilities, but it is left to implementation on how to leverage it to intelligently discover various devices contextually to trigger NAN-Aware use-cases, such as decentralized P2P data exchange, etc.

As the inventors hereof have recognized, there are many use-cases across the commercial and consumer industries that show a need for managed intelligent discovery, ranging, and/or data exchange using NAN-Aware foundational technologies, in ways that do not waste energy and can be IT-managed and/or user-configurable with actions or presets.

For example, with respect to wireless docking, systems and methods described herein may enable the use NAN-Aware technologies to discover and pair an IHS (e.g., a tablet or laptop) with a relevant wireless dock intelligently for docking connection initiation purposes. As to peripheral discovery, systems and methods described herein may enable a corporate user to walk to a new campus or office building in his company, to discover the nearest NAN-Aware printer for purposes of auto-pairing, and to print content by leveraging ranging and data sending.

In the case of multi-user discovery and content sharing situations, systems and methods described herein may trigger NAN-Awareness intelligently for purposes of decentralized P2P discovery and onward actions between co-located users for easy-connect use-cases, including decentralized P2P file sharing or content sharing. This covers NAN-Aware-based services such as discovery of proper peer, instant file transfer, content share not only for laptop-to-laptop but also for smartphone-to-laptop and laptop-to-smartphone in an Operating System (OS)-agnostic manner. As to multi-user and/or controller intelligent discovery and decentralized P2P streaming for gaming applications, systems and methods described herein may trigger NAN-Awareness intelligently for purposes of decentralized P2P discovery of certain types of gaming IHSs (e.g., DELL's ALIENWARE) for decentralized P2P game steaming as well as game controllers, to send traffic between controllers and IHSs, etc.

Additionally, or alternatively, as an example of a composite use-case, systems and methods described herein may enable NAN-Awareness to be used so that data being downloaded by infrastructure AP connections can also shared with other peer IHSs, printer information received by other methods (e.g., Wi-Fi Direct or centralized P2P) may be shared with other peer IHSs, cinema service information being projected to a display device via Wi-Fi Direct/Miracast may be shared with other peer IHSs, etc.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

FIG. 1 is a block diagram illustrating components of IHS 100 configured to manage NAN technologies for intelligent connectivity. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an OS (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for managing NAN technologies for intelligent connectivity using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112. For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used and detected, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (I²C) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
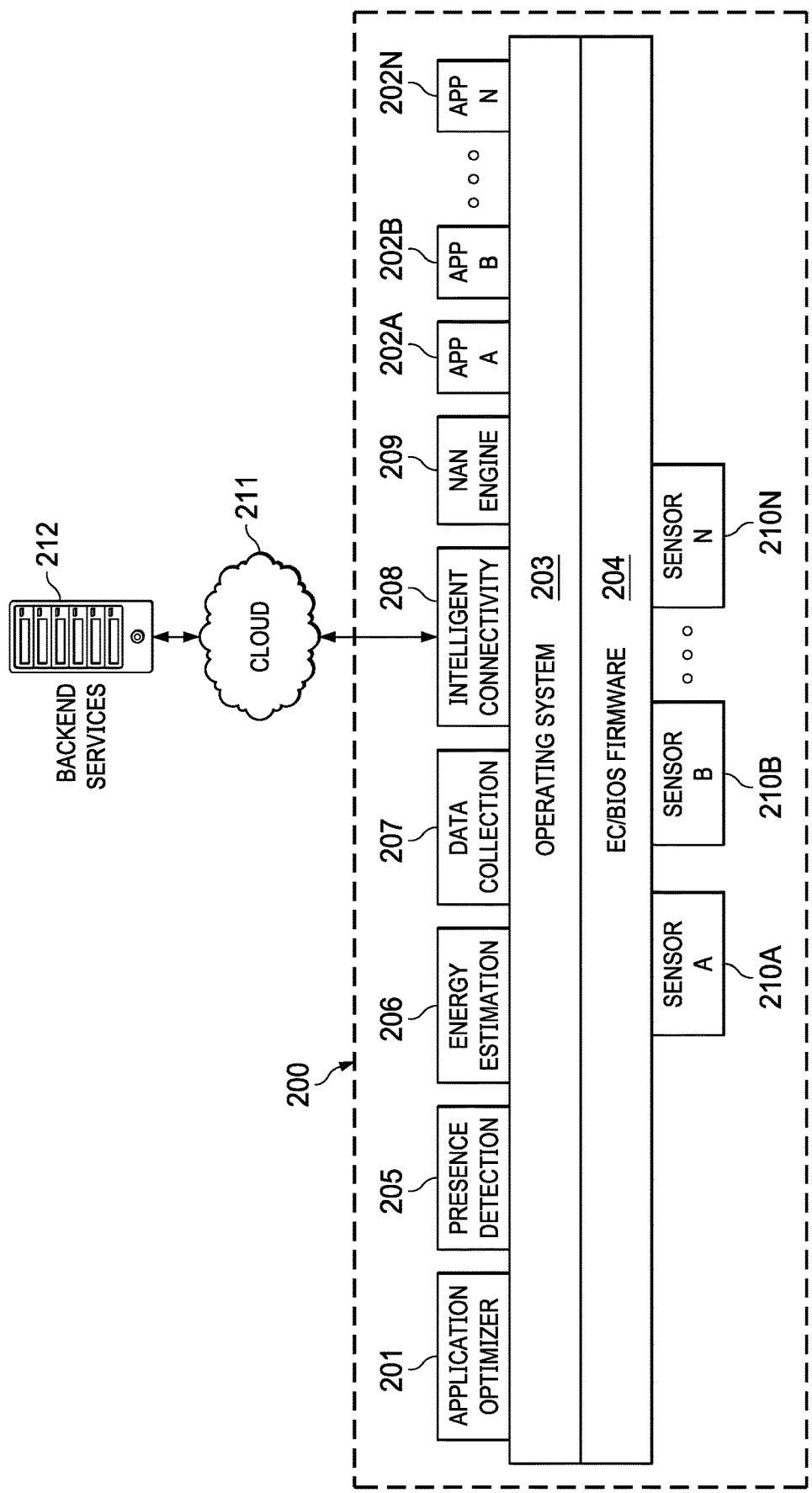
FIG. 2 is a block diagram illustrating an example of a software system configured to manage NAN technologies for intelligent connectivity, according to some embodiments.

FIG. 2 is a block diagram illustrating an example of software system 200 produced by IHS 100 for managing neighbor awareness networking technologies for intelligent connectivity. In some embodiments, each element of software system 200 may be provided by IHS 100 through the execution of program instructions by one or more logic components (e.g., CPU 100, BIOS 117, EC 120, etc.) stored in memory (e.g., system memory 105), storage device(s) 119, and/or firmware 117, 120.

As shown, software system 200 includes application optimizer engine 201 configured to manage the performance optimization of applications 202A-N. An example of application optimizer engine 201 is the DELL PRECISION OPTIMIZER Meanwhile, examples of applications 202A-N include, but are not limited to, computing resource-intensive applications such as remote conferencing applications, video editors, image editors, sound editors, video games, etc.; as well as less resource-intensive applications, such as media players, web browsers, document processors, email clients, etc.

Both application optimizer engine 201 and applications 202A-N are executed by OS 203, which is in turn supported by EC/BIOS instructions/firmware 204. EC/BIOS firmware 204 is in communication with, and configured to receive data collected by, sensor modules or drivers 210A-N—which may abstract and/or interface with respective ones of sensors 112, including any suitable combination of any of the contextual sensors described herein.

In various embodiments, software system 200 includes presence detection module or application programming interface (API) 205, energy estimation engine or API 206, data collection module or API 207, intelligent connectivity module 208, and neighbor aware networking (NAN) engine 209 executed above OS 203.

Presence detection module 205 may process user presence data received by one or more of sensor modules 210A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field, mid-field, or far-field.

Energy estimation engine 206 may include, for example, the MICROSOFT E3 engine, which is configured to provide energy usage data broken down by applications, services, tasks, and/or hardware in an IHS. In some cases, energy estimation engine 206 may use software and/or hardware sensors configured to determine, for example, whether any of applications 202A-N are being executed in the foreground or in the background (e.g., minimized, hidden, etc.) of the IHS's graphical user interface (GUI).

Data collection engine 207 may include any data collection service or process, such as, for example, the DELL DATA VAULT configured as a part of the DELL SUPPORT CENTER that collects information on system health, performance, and environment. In some cases, data collection engine 207 may receive and maintain a database or table that includes information related to IHS hardware utilization (e.g., by application, by thread, by hardware resource, etc.), power source (e.g., battery relative state-of-charge (RSOC), AC-plus-DC state, AC-only state, or DC-only state), etc.

In operation, application optimizer engine 201 monitors applications 202A-N executing on IHS 100. Particularly, application optimizer engine 201 may gather data associated with the subset of I/O parameters for a predetermined period of time (e.g., 15, 30, 45, 60 minutes or the like). For each of applications 202A-N, the classifier may use the gathered data to characterize the application's workload with various settings, memory usage, responsiveness, etc.

Intelligent connectivity module 208 may be configured to provide intelligent and/or contextual connectivity capabilities to NAN engine 209. For example, module 208 may be configured by an IT decision maker (ITDM) for pre-pairing the IHS with other IHSs, specific commercial entities, or a gaming pre-pairing (e.g., at the IHS's factory), and it may include a default rule table for initiating a discovery phase in active or standby states, rules for disconnect phase, and/or deployment rules. In some cases, intelligent connectivity module 208 may communicate with backend services 212 (e.g., to acquire new rules or policies, to utilize machine learning, crowdsourcing, or artificial intelligence features, etc.) over cloud 211 (e.g., the Internet).

In some embodiments, intelligent connectivity module 208 may operate in at least four distinct phases: initialization, discovery, P2P, and disconnect. Particularly, in the initiation phase, an IT decision maker may pre-pair the IHS with specific commercial entities or a gaming pre-pairing at the factory, as well as setting of defaults of rules table for initiating the discovery phase in active or standby states, rules for the disconnect phase, and deployment rules from backend services 212 to module 208 at the initialization or discovery phase.

During the initialization phase, service list(s), a service preference order, and/or service triggering condition(s) (e.g., throughput, bandwidth, ranging condition, etc.) of multiple applications 202A-N may be prepared so that NAN-Aware-based corresponding protocols such as device discovery, service discovery, and/or file transfer(s) may be sequentially followed automatically. Additionally, or alternatively, user context-based whitelisting and/or blacklisting of applications 202A-N can be additionally enabled for NAN-Aware operation.

When NAN-Awareness is used along with other types of connectivity (e.g., contents which are being downloaded by infrastructure AP connection needs to be shared to other peer by Wi-Fi Aware, or printer information which is got by Wi-Fi Direct (centralized P2P) needs to be shared to newly-encountered peer by Wi-Fi Aware (decentralized P2P)), the initialization phase may also prepare the preferred assignment of multiple applications or types of traffic across NAN-Aware and other connections to optimize concurrent communications.

With respect to the discovery phase, any of the context information (e.g., proximity, location, calendar events, IHS posture, etc.) discussed herein may be used, alone or in combination, to trigger the start of such a phase, where a NAN-Aware "on" state is triggered with a given frequency and/or event driven via a wireless driver or the like. Particularly, a state transition to "on" or "off" of NAN-Aware mode in a wireless driver through an APIs may be accompanied by setting a scan frequency, a number of simultaneous channel support by NAN engine 209, NAN-Aware internal timing window(s), triggering proximity distance condition(s), how instantly a service is pushed or found, etc.

In some cases, discovery may be user-initiated, it may follow contextual rules (e.g., location, time-of-day, etc.), or it may be triggered by ML with context to enable state transitions from NAN-Aware "On"→"Off" or "Off"→"On" and/or by referring to various radio configurations (e.g., screen projections to display device is needed at the same time or not, etc.). Moreover, transitions from Dual-Band Simultaneous (DBS) to single link using NAN engine 208 and other links (e.g., Wi-Fi Direct, etc.) along with other DBS to non-DBS transitions may also be provided during discovery. On a radio link wherein an infrastructure AP connection is already working, for example, NAN-Aware connections may be added (whereas Wi-Fi Direct cannot).

In various embodiments, the P2P phase in entered upon after discovery is successful to establish a decentralized P2P or mesh session using NAN engine 209. The disconnect phase may be initiated in response to intelligent connectivity module 208 detecting a context change that meets a disconnect rule (e.g., the user closing an IHS lid as determined by a hinge angle sensor, or other action such as walking away from conference room, etc.).

Backend services 212 may execute a manageability engine that communicates with intelligent connectivity module 208, In operation, during an initialization phase, backend services 212 transmits configuration information (e.g., pairings, NAN-Aware setting defaults, such as rules to start/stop discovery phase, etc.) to intelligent connectivity module 208. Second, during a training phase, backend services 212 may use ML and/or AI techniques to identify optimal context settings for intelligent connectivity module 208 to trigger state transitions in the discovery phase. Then, backend services 212 may push one or more trained models to intelligent connectivity module 208.

In implementations where IHS 100 is a peripheral device, such as a printer, etc., a firmware service may be deployed within that device to perform the aforementioned operations of intelligent connectivity module 208 (e.g., initialization, discovery, P2P, and disconnect) and/or NAN engine 209, as well as to implement dynamic updates of service list(s), service preference order(s), and service triggering condition (e.g., throughput, bandwidth, ranging condition, etc.) of applications 202A-N so that NAN-Aware-based corresponding protocols for the next turn can be used automatically.

Figure 3:
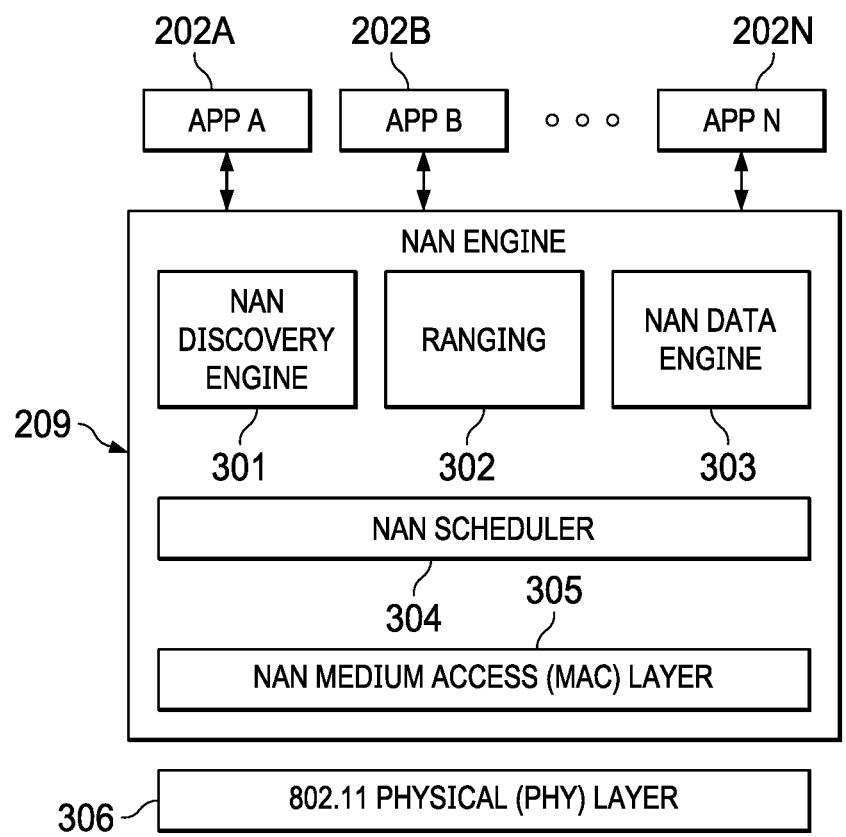
FIG. 3 is a block diagram illustrating an example of NAN technology, according to some embodiments.

FIG. 3 is a block diagram illustrating an example of NAN technology 300 that may be used within NAN engine 209 and controlled by intelligent connectivity module 208 based upon contextual information, according to some embodiments. A non-limiting example of technology 300 is the Wi-Fi AWARE protocol issued by the Wi-Fi Alliance, which enables Wi-Fi AWARE-certified IHSs to discover, connect, and exchange data with each other. As shown, NAN engine 209 is in communication with applications 202A-N and it includes NAN discovery engine 301, ranging module 302, NAN data engine 303, NAN scheduler 304, and NAN medium access (MAC) layer 305; and it is supported by 802.11 physical (PHY) layer 306.

In operation, in order to enable power-efficient, continuous discovery of devices, NAN engine 209 employs low duty cycle MAC protocols and/or adaptive clustering. This technology uses a protocol to establish a common heartbeat to keep all IHSs on the same schedule and thereby reduce energy consumption, while also being sufficiently dynamic to maintain a group cluster even when an IHS moves out of antenna range. Additionally, or alternatively to Wi-Fi, NAN engine 209 may use Bluetooth Low Energy (BLE) or the like for extremely low power and discovery operations that further increase power savings. When BLE is used for discovery, for example, Bluetooth Transport Discovery Service (TDS) can trigger the Wi-Fi radio system (referred to as BLE triggering) when appropriate such as when desired IHSs and/or services are discovered.

NAN engine 209 can autonomously detect, alert, and connect to other IHSs without an access point (AP). By using NAN engine 209, any of applications 202A-N can be configured to alert an IHS user to nearby IHSs running a different instance of the same application. For example, discovery may be conditioned upon parameters such as distance to alert a user when another IHS running the same application is less than ten feet away. Additionally, or alternatively, applications 202A-N may be configured to establish a secure, high-throughput P2P or mesh data connection to another IHS for application data exchange.

Under orchestration by NAN scheduler 304, NAN discovery engine 301 may establish a coordinated heartbeat of wake and sleep among NAN devices within range using Wi-Fi and/or Bluetooth LE. NAN discovery engine 301 may also define how applications 202A-N discover available applications and/or services on nearby IHSs, and it may also provide a way for application developers to create unique identifiers (service IDs) for applications and services.

Ranging module 302 may execute accurate P2P or mesh ranging using, for example, fine timing measurement (FTM) protocol directly between NAN-aware devices. Meanwhile, NAN data engine 303 provides a mechanism for establishing P2P or mesh data connections upon discovery with built-in security, delivers multicast traffic capabilities by allowing NAN-aware IHSs to exchange data with many users at once (simultaneous multi-band/channel even in the absence of DBS), forms one or more application-specific data links within one or more clusters, and/or provisions IP-based properties during P2P or mesh data connection setup.

Figure 4:
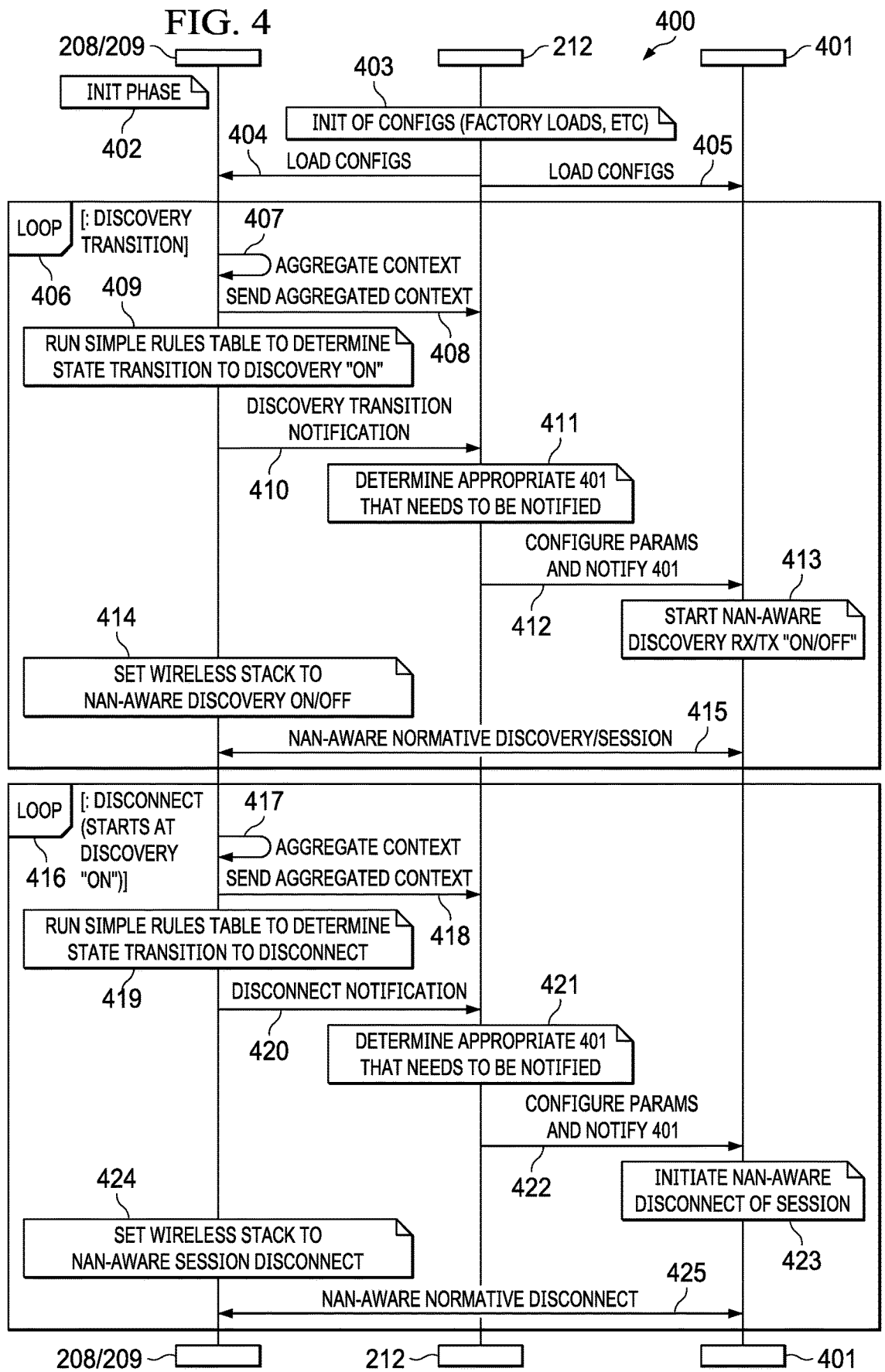
FIG. 4 is a flowchart illustrating an example of a method for managing NAN technologies for intelligent connectivity, according to some embodiments.

FIG. 4 is a flowchart illustrating an example of method 400 for managing NAN technologies for intelligent connectivity. In some embodiments, method 400 may be performed, at least in part, by the operation of intelligent connectivity module 208 and/or NAN engine 209 (shown collectively here as "208/209"), backend services 212, and/or peripheral device(s) 401 (e.g., one of I/O devices 111).

At 402, intelligent connectivity module 208 enters its initialization phase. At 402, backend services 212 retrieves initialization configuration elements (e.g., factory pre-pairings, loads, etc.). At 404, backend services 212 sends respective load configuration settings or files to intelligent connectivity module 208 and at 405 sends other sends respective load configuration settings or files to peripheral device 401, if present.

Loop 406 represents a transition of a discovery state from "off" to "on". Particularly, at 407, intelligent connectivity module 208 aggregates any combination of the aforementioned contextual information. Examples of contextual information include, but are not limited to: platform/sensor input, eye/facial tracking, user ID, type of I/O (keyboard, mouse, stylus, etc.) being used, IHS location, voice/gesture/command, biometrics, audio, application/OS/user, foreground application, background application, time spent using an application, services/processes, time-of-day, day-of-the-week, calendar/scheduled events, types of calendar events (e.g., business meetings, personal events, etc.), system hardware settings, environmental inputs, ambient sound, ambient lighting, weather, other events, etc.

For instance, a first portion of the context information may be collected using sensors 210A-N, and a second portion may be collected using presence detection module 205, energy estimation engine 206, and/or data collection module 207.

At 408, intelligent connectivity module 208 sends the aggregated context to backend services 212. At 409, module 208 may evaluate one or more rules table to determine whether to transition the NAN discovery to an "On" state based upon the context information. If the rules are met 410, intelligent connectivity module 208 sends a discovery transition notification to backend services 212.

At 411, backend services 212 determines whether an appropriate (e.g., local with respect to IHS 100) peripheral device 401 (or another IHS) should be notified. If so, at 412, backend services 212 retrieves additional configuration parameters and notifies peripheral device 401. Then, at 413, peripheral device 401 starts NAN-Aware discovery reception and transmission by adjusting its On/Off state as needed. At 414, intelligent connectivity module 208 sets a wireless stack to NAN-Aware discovery On/Off, as appropriate, and at 415 intelligent connectivity module 208 and peripheral device 401 establish a NAN-Aware normative discovery process and/or data communication session.

Loop 416 represents a disconnection transition when discovery is "On." Specifically, at 417, intelligent connectivity module 208 aggregates any combination of the aforementioned contextual information. At 418, intelligent connectivity module 208 sends the aggregated context to backend services 212. At 419, module 208 may evaluate one or more rules table to determine whether to transition the NAN discovery to a "disconnect" state based upon the context information. If the rules are met 410, at 420, intelligent connectivity module 208 sends a disconnect notification to backend services 212.

At 421, backend services 212 determines whether an appropriate (e.g., local with respect to IHS 100) peripheral device 401 (or another IHS) should be notified. If so, at 422, backend services 212 retrieves additional configuration parameters and notifies peripheral device 401. At 423, peripheral device 401 initiates a NAN-Aware disconnect session. At 424, intelligent connectivity module 208 sets a wireless stack to NAN-Aware disconnect, and at 425 intelligent connectivity module 208 and peripheral device 401 establish a NAN-Aware normative disconnect session.

Figure 5:
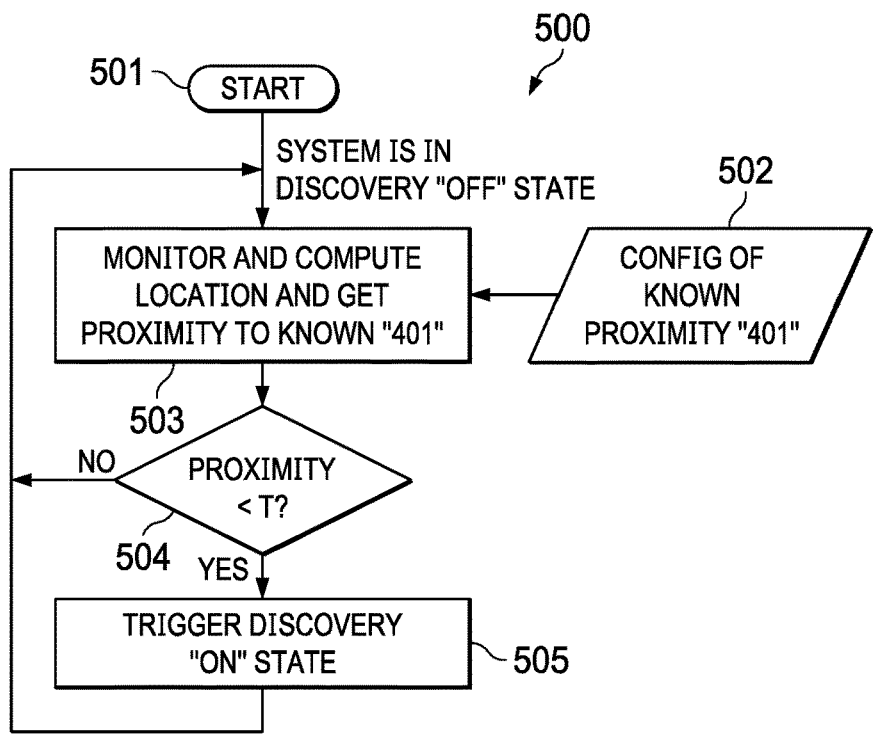
FIGS. 5 and 6 are examples of methods for triggering different discovery state transitions, according to some embodiments.

FIG. 5 is a flowchart illustrating an example of method 500 for triggering a first discovery state transition ("Off" to "On"), according to some embodiments. In some cases, method 500 may be performed, at least in part, by the operation of intelligent connectivity module 208 and/or NAN engine 209 (shown collectively here as "208/209"), backend services 212, and/or peripheral device(s) 401 (e.g., one of I/O devices 111). Moreover, in some implementations, method 500 may be executed as part of loop 406 in FIG. 4 above.

Method 500 starts at block 501, where IHS 100 has its discovery state set to "Off" At block 502, method 500 receives configuration information of a known peripheral device 401, including proximity information, and at block 503 method 500 monitors and computes location information, and/or any other contextual information available, as well as the IHS's proximity to peripheral device 401.

At block 504, method 500 evaluates a rule, such as whether the proximity is smaller than a threshold value and, if so, block 505 triggers the discovery "On" state. Otherwise control returns to block 503. Although block 504 provides a simple rule for sake of illustration, in other embodiments the rule may have other levels of complexity, such that any selected combination of contextual information may be used (e.g., proximity, location, IHS posture, battery level, and calendar event combined).

For example, if IHS 100 is determined to be entering a location in terms of location (e.g., using TOF based doppler sensors 112), then intelligent connectivity module 208 may trigger discovery "on" state of NAN engine 209. If intelligent connectivity module 208 or backend services 212 determine IHS 100 is in close proximity to peripheral 401, then intelligent connectivity module 208 may trigger discovery "on" state of NAN engine 209, as well as push discovery "on" periodic mode to peripheral device 401 from backend services 212.

As another example, if a user has lunch from noon to 1:00 PM daily and blocks his calendar a certain way and takes his laptop to the office in modern standby, the intent of that user is to eat lunch but not to actively pair the laptop by starting intelligent discovery. However, the same user may keep his laptop with him to continue into a 1:00 PM meeting in a café, such that a calendar-based may turn "off" intelligent discovery phase.

In some cases, method 500 may disable active discovery triggers when RSOC of battery is below "x %," or if the user is actively using IHS 100 from a foreground application point-of-view, which can save power. Moreover, intelligently allocating channel for NAN-Awareness so that it does not conflict and/or collide with regular Wi-Fi connections may improve throughput by 20-30% or more.

Method 500 may also be used to enable active discovery triggers when the corresponding radio for NAN-Aware data connections (decentralized P2P) is not under Miracast/Infracast screen projection running on top of Wi-Fi Direct (centralized P2P). In any of these cases, instead of entirely turning on NAN-Aware discovery, intelligent connectivity module 208 may adjust NAN-Aware internal timing window (s) depending on the triggering conditions and rules.

Figure 6:
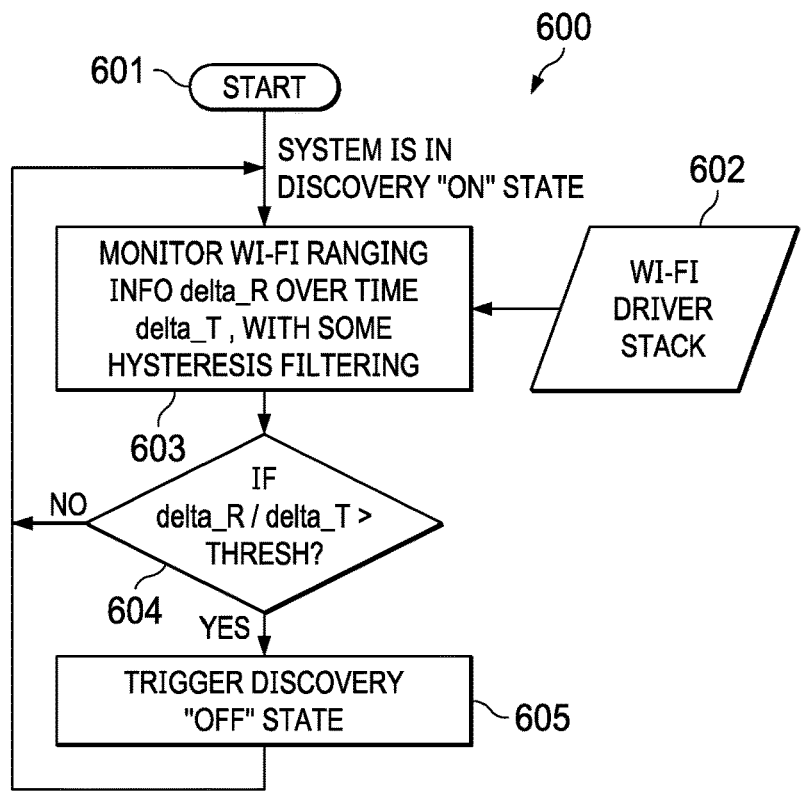

FIG. 6 is a flowchart illustrating an example of method 600 for triggering a second discovery state transition ("On" to "Off"), according to some embodiments. In some cases, method 600 may be performed, at least in part, by the operation of intelligent connectivity module 208 and/or NAN engine 209 (shown collectively here as "208/209"), backend services 212, and/or peripheral device(s) 401 (e.g., one of I/O devices 111). Moreover, in some implementations, method 500 may be executed as part of loop 416 in FIG. 4 above.

Method 600 starts at block 601, where IHS 100 has its discovery state set to "on." At block 602, method 600 communicates with a WiFi stack driver to obtain ranging information, and at block 603 method 500 monitors and computes Wi-Fi ranging information "delta_R" over time "delta_T", with some hysteresis filtering.

At block 604, method 600 evaluates a rule, such as whether the ratio of delta_R over delta_T is greater than a threshold value and, if so, block 605 triggers the discovery "Off" state. Otherwise control returns to block 603. Although block 604 provides a simple rule for sake of illustration, in other embodiments the rule may have other levels of complexity, such that any selected combination of contextual information may be used (e.g., proximity, location, IHS posture, battery level, and calendar event combined).

For example, if IHS 100 is determined to be leaving the location of a meeting (e.g., the user is walking away), which may be validated by time of day with calendar event, block 605 may trigger the discovery "Off" state. If an IHS lid close even (using a lid sensor or hinge angle sensor) is correlated with time of day and a corresponding calendar event, block 605 may trigger the discovery "Off" state.

In another example, if another user is projecting to Miracast or NAN-Aware or Wi-Fi Direct using Easy connect, and the other user's IHS is corrected to that session, block 605 may trigger the discovery "Off" state (there is no point in initiating discovery or doing other P2P tied to same content; although P2P may still be desirable for other actions). Moreover, intelligent connectivity module 208 may also disable active discovery triggers when the corresponding radio for NAN-Aware (decentralized P2P) is not under Miracast/Infracast screen projection running on top of Wi-Fi Direct (centralized P2P).

Similarly as above, in any of these cases, instead of entirely turning off NAN-Aware discovery, intelligent connectivity module 208 may adjust NAN-Aware internal timing window(s) depending on the triggering conditions and rules.

Accordingly, systems and methods described herein may be used to intelligent manage (initiate, orchestrate, learn, and/or pair) discovery for purposes of intelligent connectivity across advanced experiences, using NAN-Aware technologies (e.g., Wi-Fi Aware, etc.). These systems and methods may be applied, in part, to reduce consumption (~0.3 W) of standby or active power (e.g., tied to Wi-Fi stack working in modern standby mode). Additionally, or alternatively, these systems and methods may prevent different connections, such as Wi-Fi Aware (decentralized P2P) and regular Wi-Fi and Wi-Fi Direct (centralized P2P) from crowding the same communication channel all the time, thus improving Wi-Fi performance for multiple endpoints.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
determine that an intelligent connectivity rule is satisfied by context information collected by the IHS, wherein the context information comprises an IHS posture, wherein the context information includes proximity of the IHS to a peripheral device, and wherein the intelligent connectivity rule is satisfied when the proximity of the IHS to the peripheral is below a threshold value, wherein the context information further comprises at least one of: an identity of the user, a time-of-day, a calendar event, or a type of calendar event; and
in response to the determination, change the discovery state of a neighbor awareness networking (NAN)-Aware engine, to an On state; and
establish a decentralized peer-to-peer (P2P) connection with at least one of: another IHS or the peripheral device via the NAN-Aware engine.

2. The IHS of claim 1, wherein the context information further comprises at least one of: a duration of execution of an application, or a mode of execution of an application.

3. The IHS of claim 1, wherein the context information further comprises at least one of: a user's proximity to the IHS, or a network connection.

4. The IHS of claim 1, wherein the context information further comprises a power usage.

5. The IHS of claim 1, wherein the context information further comprises a proximity of the IHS to a peripheral device.

6. The IHS of claim 1, wherein the context information comprises at least one of: an IHS posture, a hinge angle, or a lid state.

7. The IHS of claim 1, wherein the context information is collected, at least in part, via one or more hardware sensors coupled to the IHS.

8. The IHS of claim 1, wherein the program instructions, upon execution, further cause the IHS to receive the intelligent connectivity rule from a backend service over a network.

9. The IHS of claim 1, wherein the discovery state is selected from the group consisting of: On and Off.

10. The IHS of claim 9, wherein the program instructions, upon execution, further cause the IHS to establish or terminate the decentralized peer-to-peer (P2P) connection after having changed the discovery state.

11. The IHS of claim 10, wherein the decentralized P2P comprises a Wi-Fi-Aware connection.

12. The IHS of claim 10, wherein the decentralized P2P is established concurrently with a centralized P2P connection.

13. The IHS of claim 12, wherein the centralized P2P comprises at least one of: a Wi-Fi connection or a Wi-Fi Direct connection.

14. A memory storage device having program instructions stored thereon that, upon execution by one or more processors of an Information Handling System (IHS), cause the IHS to:
receive an intelligent connectivity rule from a backend service over a network;
determine that the intelligent connectivity rule is satisfied by context information collected by the IHS, wherein the context information includes proximity of the IHS to a peripheral device, and wherein the intelligent connectivity rule is satisfied when the proximity of the IHS to the peripheral is below a threshold value, wherein the context information further comprises at least one of: an identity of the user, a time-of-day, a calendar event, or a type of calendar event;
in response to the determination, change the discovery state of a neighbor awareness networking (NAN)-Aware engine to an On state; and
establish a decentralized peer-to-peer (P2P) connection with at least one of: another IHS or the peripheral device via the NAN-Aware engine.

15. The memory storage device of claim 14, wherein the context information further comprises at least one of: a user's proximity to the IHS, or a location of the IHS.

16. The memory storage device of claim 14, wherein the context information further comprises at least one of: a power usage, or a battery charge.

17. The memory storage device of claim 14, wherein the context information further comprises at least one of: an IHS posture, a hinge angle, or a lid state.

18. A method, comprising:
- receiving, at an Information Handling System (IHS), an intelligent connectivity rule from a backend service over a network;
- determining that the intelligent connectivity rule is satisfied by context information collected by the IHS, wherein the context information comprises a time of day and a calendar event;
- in response to the determination, changing the discovery state of a neighbor awareness networking (NAN)-Aware engine to an Off state; and
- terminating a decentralized peer-to-peer (P2P) connection with at least one of: another IHS or a peripheral device via the NAN-Aware engine.

19. The memory storage device of claim 14, wherein the context information further comprises Wi-Fi ranging information.

\* \* \* \* \*